(12) United States Patent
Jung

(10) Patent No.: US 7,841,861 B2
(45) Date of Patent: Nov. 30, 2010

(54) ENCODER SPACER FOR A SPINDLE MOTOR AND ENCODER ASSEMBLY INCLUDING THE SAME

(75) Inventor: Hee Chul Jung, Gyeonggi-do (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 12/580,491

(22) Filed: Oct. 16, 2009

(65) Prior Publication Data

US 2010/0099278 A1    Apr. 22, 2010

(30) Foreign Application Priority Data

Oct. 20, 2008    (KR)    .................. 20-2008-0013931 U

(51) Int. Cl.
*H01R 12/00*    (2006.01)
(52) U.S. Cl. ............................ 439/65; 439/75; 439/631
(58) Field of Classification Search .................. 439/65, 439/75, 631
See application file for complete search history.

(56) References Cited

U.S. PATENT DOCUMENTS

| | | | | |
|---|---|---|---|---|
| 5,026,290 A | * | 6/1991 | Dery | ........................... 439/65 |
| 5,908,333 A | * | 6/1999 | Perino et al. | ................. 439/631 |
| 6,472,744 B1 | * | 10/2002 | Sato et al. | ................... 439/631 |
| 6,840,808 B2 | * | 1/2005 | Ruckerbauer et al. | ....... 439/631 |

* cited by examiner

*Primary Examiner*—Tho D Ta
(74) *Attorney, Agent, or Firm*—Saliwanchik, Lloyd & Saliwanchik

(57) ABSTRACT

A encoder spacer for a spindle motor and an encoder assembly including the same are disclosed wherein the encoder spacer comprises: a body in monolithic structure made of insulation material; a first terminal electrically connected to a main PCB (Printed Circuit Board) of the spindle motor and protruded from a lateral surface of the body; a second terminal electrically connected to the first terminal via a conduction path through the body, electrically connected to an auxiliary PCB and protruded from an upper surface of the body; a substrate groove including an accommodation space for accommodating the encoder formed at an upper center of the body, wherein the auxiliary PCB slides in the accommodation space by being inserted into a both sides of the accommodation space; and a third terminal exposed at the substrate groove for electrically connecting the auxiliary PCB with the first terminal.

12 Claims, 3 Drawing Sheets

US 7,841,861 B2

ENCODER SPACER FOR A SPINDLE MOTOR AND ENCODER ASSEMBLY INCLUDING THE SAME

CROSS-REFERENCE TO RELATED APPLICATION

This application claims the benefit under 35 U.S.C. §119 of Korean Patent Application No. 20-2008-0013931, filed Oct. 20, 2008, which is hereby incorporated by reference in its entirety.

BACKGROUND

The present disclosure relates to an encoder spacer for a spindle motor and an encoder assembly including the same.

A spindle motor performs the function of rotating a disk to enable an optical pickup which linearly reciprocates in an Optical Disk Drive (ODD) to read data recorded on the disk.

With the technical advancement of an Optical Disk Drive (ODD), a new ODD has been developed and used. The new ODD has a light scribe function of forming a desired design on the surface of a Compact Disk (CD) or a Digital Versatile Disk (DVD) by using laser.

In order to reproduce information recorded on a disk or record information on the disk, the disk must be rotated at a high speed of approximately 5,400 rpm. In contrast, in order to form a design on the surface of the disk, the disk must be rotated at a low speed of approximately 40 rpm in a state in which the disk is mounted on a turntable by turning over the disk.

To this end, an encoder may be installed at the spindle motor in order to determine if the disk rotates at a proper speed when forming the design on the surface of the disk.

FIG. 1 is a cross-sectional view illustrating configuration of the conventional spindle motor and FIG. 2 is an exploded perspective view illustrating an encoder assembly of FIG. 1.

Referring to FIG. 1, a turntable 11 mounted with a disk 50 is provided, and an upside-down disk 50 is mounted on the turntable 11 to allow an upper surface of the disk 50 attached with a label to face downward when a design is formed on the surface of the disk 50.

A rim-shaped recognition mark 53 is formed on a certain portion of the disk 50 positioned at a periphery of the turntable 11, i.e., an upper surface portion of the disk 50 on which the design is formed, and an encoder 21 is installed on a main Printed Circuit Board (PCB 13) underneath the recognition mark 53. The encoder 21 detects the recognition mark 53 to determine if the disk rotates at a proper speed.

In more detail, since the encoder 21 is manufactured in a small size, a support member, e.g., a spacer, can be interposed between the encoder 21 and the disk 50 in order to allow a gap between the encoder 21 and the disk 50 to be within a predetermined range.

Referring to FIG. 2, a spacer 23 is integrally connected by insert mold injection to a terminal 26 connected to the main PCB 13 and a terminal 25 connected to an auxiliary PCB 27, and the auxiliary PCB 27 mounted with the encoder 21 is installed on an upper surface of the spacer 23.

The auxiliary PCB 27 is formed with a via hole 27a through which the terminal 25 of the spacer 23 can pass, and is fixed to an upper surface of the spacer 23 by way of soldering, while the terminal 26 is soldered to the main PCB 13.

Generally, a spindle motor can be categorized into two types based on a height of the motor, that is, a super slim spindle motor and a slim spindle motor, where each of the two motors must have a different assembled encoder height due to a different turntable height.

However, there is a disadvantage in the configuration thus mentioned in that parts cannot be commonly used due to the fact the height of injection-molded spacer must be differently designed. Another disadvantage is that it is difficult to manufacture a spacer due to a very low height of the turntable for the super slim spindle motor.

BRIEF SUMMARY

The present disclosure is to provide an encoder spacer for a spindle motor and an encoder assembly including the same, capable of being commonly used to a super slim spindle motor and a slim spindle motor each having a different turntable height.

According to one general aspect of the present disclosure, an encoder spacer for a spindle motor comprises: a body in monolithic structure made of insulation material; a first terminal electrically connected to a main PCB (Printed Circuit Board) of the spindle motor and protruded from a lateral surface of the body; a second terminal electrically connected to the first terminal via a conduction path through the body, electrically connected to an auxiliary PCB and protruded from an upper surface of the body; a substrate groove including an accommodation space for accommodating the encoder formed at an upper center of the body, wherein the auxiliary PCB slides in the accommodation space by being inserted into a both sides of the accommodation space; and a third terminal exposed at the substrate groove for electrically connecting the auxiliary PCB with the first terminal.

According to another general aspect of the present disclosure, an encoder spacer for a spindle motor comprises: a body in monolithic structure made of insulation material; a first terminal electrically connected to a main PCB (Printed Circuit Board) of the spindle motor; a second terminal electrically connecting a first auxiliary PCB mounted with an encoder and the first terminal; and a third terminal electrically connecting a second auxiliary PCB mounted with an encoder and the first terminal, wherein any one of the first auxiliary PCB and the second auxiliary PCB is fixed to the body at a mutually different position.

According to still another general aspect of the present disclosure, an encoder assembly comprises: an encoder; an encoder spacer including a body in monolithic structure made of insulation material, a first terminal electrically connected to a main PCB (Printed Circuit Board) of the spindle motor, a second terminal electrically connecting a first auxiliary PCB mounted with an encoder and the first terminal, and a third terminal electrically connecting a second auxiliary PCB mounted with an encoder and the first terminal, wherein any one of the first auxiliary PCB and the second auxiliary PCB is fixed to the body at a mutually different position.

DETAILED DESCRIPTION

An exemplary embodiment of the present disclosure will be described in detail with reference to the accompanying drawings.

Figure 1:
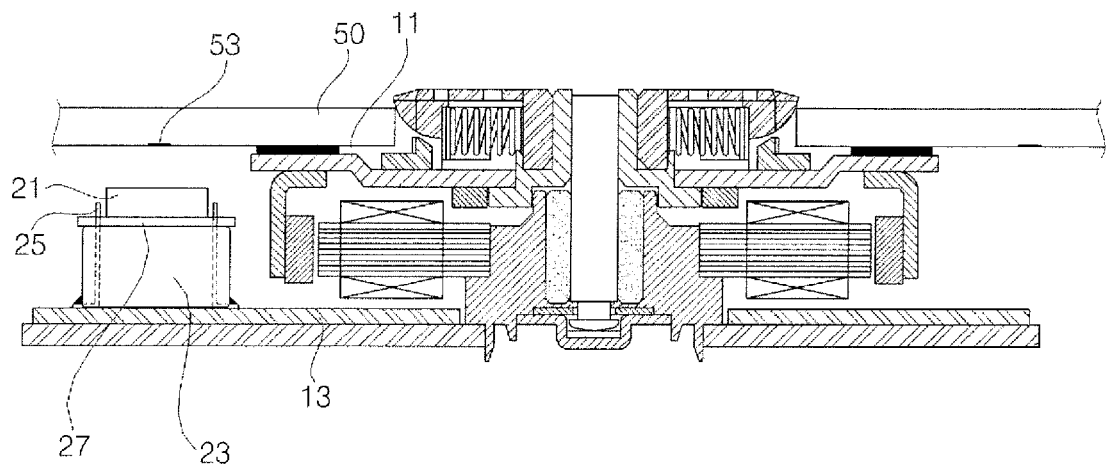
FIG. 1 is a cross-sectional view illustrating configuration of the conventional spindle motor.
Figure 2:
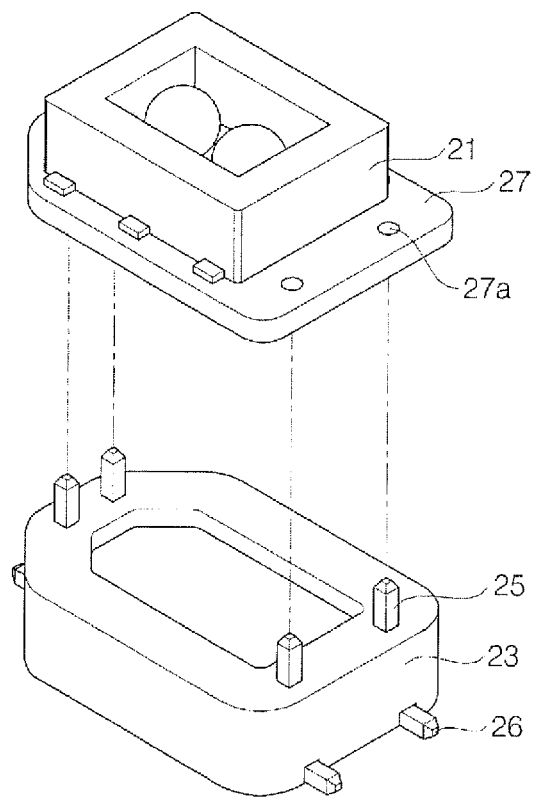
FIG. 2 is an exploded perspective view illustrating an encoder assembly of FIG. 1.
Figure 3:
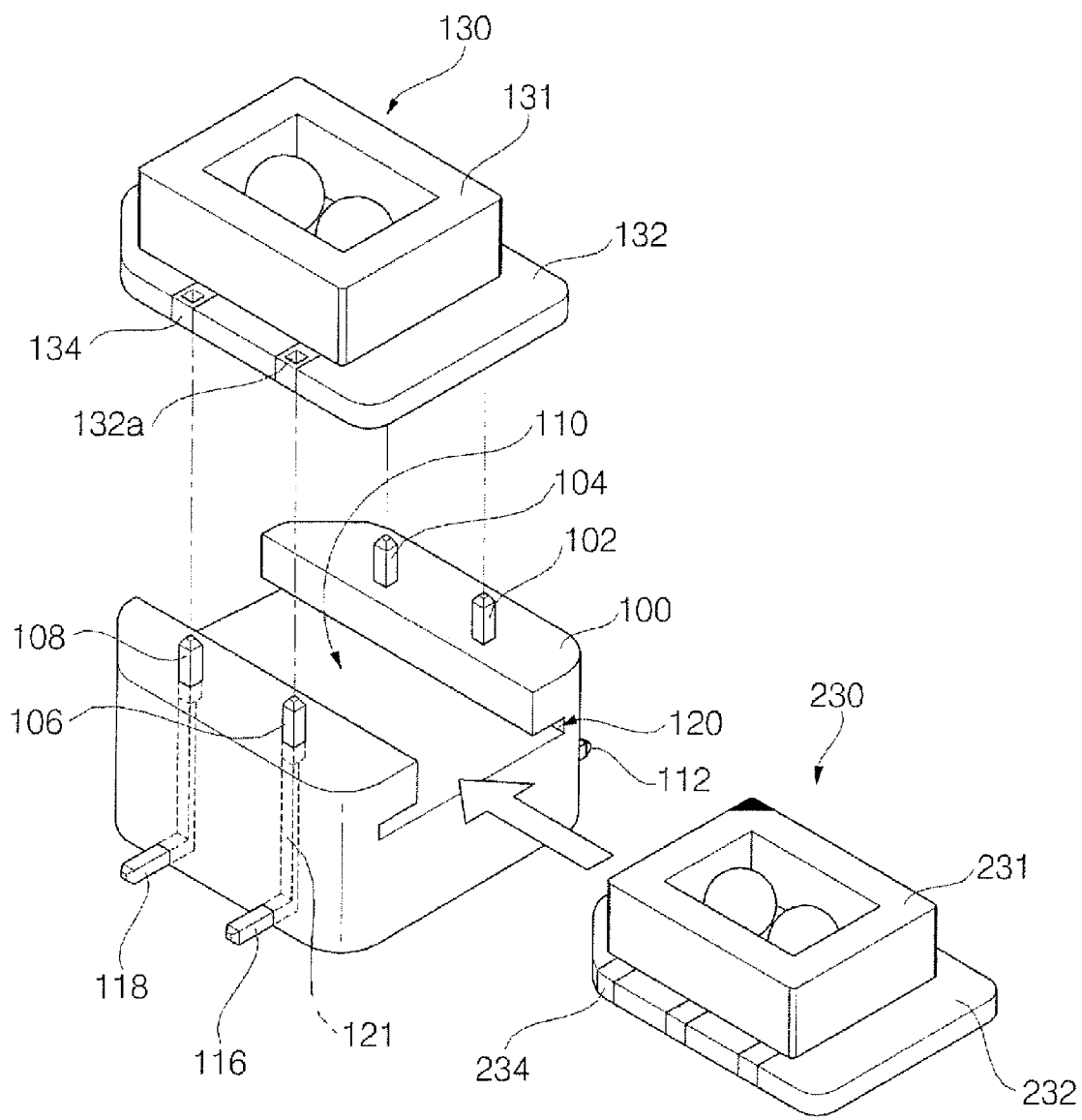
FIG. 3 is an exploded perspective view of an encoder assembly according to an exemplary embodiment of the present invention.
Figure 4:
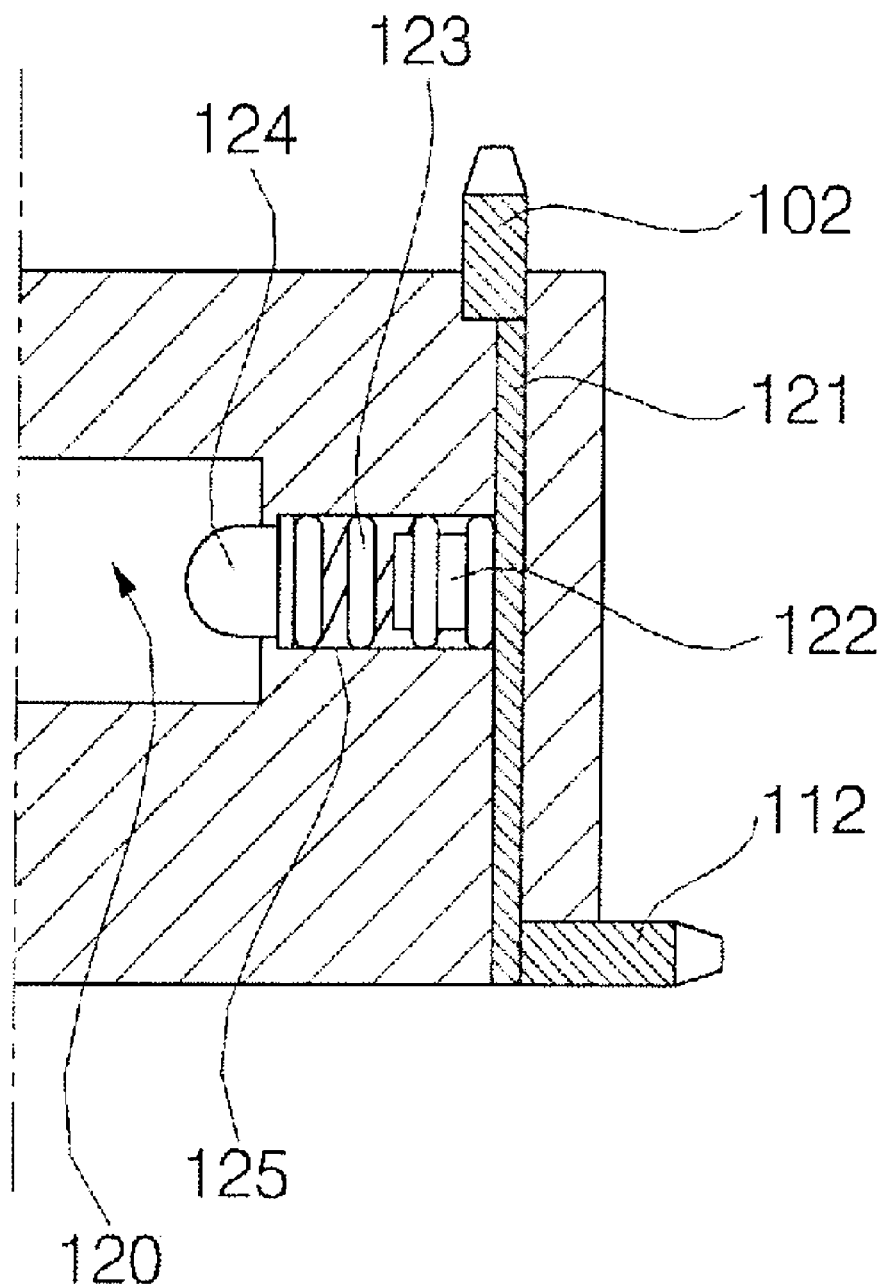
FIG. 4 is a cross-sectional view illustrating a terminal contact structure.

FIG. 3 is an exploded perspective view of an encoder assembly according to an exemplary embodiment of the present invention, and FIG. 4 is a cross-sectional view illustrating a terminal contact structure.

Referring to FIG. 3, an encoder spacer 100 according to an exemplary embodiment of the present invention may include a body 101 in monolithic structure made of insulation material, first terminals (102, 104, 106, 108) each exposed to an upper surface of the body 101, second terminals (112, 116, 118) electrically connected to the first terminals (102, 104, 106, 108) via a conduction path inside the body 101 and protruded to a lateral surface of the body 101, where the encoder spacer 100 may be manufactured by inserted injection molding process.

As noted from the following, the second terminals are electrically connected to a main PCB (Printed Circuit Board) of the spindle motor while the first terminals (102, 104, 106, 108) are electrically connected to first and second auxiliary PCBs of an encoder unit.

In some exemplary embodiments, an upper center of the encoder spacer 100 is formed with an accommodation space 110 for accommodating an encoder unit 230, a substrate groove 120 is formed for guiding a second auxiliary PCB 232 to be inserted thereinto and to slide to both sides of the accommodation space, and a third terminal formed in the substrate groove 120 for being electrically connected to the second auxiliary PCB.

Referring to FIG. 4, a bottom surface of the substrate groove 120 is formed with a terminal groove 125, a support protruder 122 is connected to a portion of the conduction path 121 corresponding to the terminal groove 125, a tip end of a spring 123 is inserted to the support protruder 122 within the terminal groove 125, and the other end of the spring 123 is inserted by a contact ball 124 to form a third terminal.

By these configurations, the contact ball 124 is capable of moving within the terminal groove 125 in response to the elasticity of the spring 123 to facilitate a contact with a conduction pattern 234 of an auxiliary PCB 232 of the encoder unit, whereby contact reliability can be enhanced due to pressure application by the spring 123.

The structure of the third terminal is not limited to the present exemplary embodiment. For example, a branch terminal may be exposed to a bottom surface of the substrate groove 120 in the conduction path 121 to thereby achieve the purpose of the present disclosure.

The encoder spacer 100 thus configured may be used as a common part and may be used for a super slim spindle motor and a slim spindle motor as well. However, there may be some changes in the structure of the encoder unit that is applied.

Referring to FIG. 3, a first encoder unit 130 fixed on an upper surface of the encoder spacer 100 is intended for slim spindle motor, and a second encoder unit 230 accommodated into the accommodation space 110 is intended for a super slim spindle motor.

The first encoder unit 130 for slim spindle motor may be divided into an encoder 131 and a first auxiliary PCB 132 mounted with the encoder 131, where both peripheral margins of the first auxiliary PCB 132 is formed with a via hole 132a overlapped with a conduction pattern 134 drawn out from the encoder 131.

Accordingly, in a case the encoder unit 130 is mounted on an upper surface of the encoder spacer 100, the first terminal 106 is inserted and soldered to the via hole 132a to be electrically connected to the conduction pattern 134 electrically.

The second encoder unit 230 for super slim spindle motor may include an encoder 231 and a second auxiliary PCB 232 mounted with the encoder 231, where both lateral surfaces of the second auxiliary PCB 232 are extended to a conduction pattern 234 that is drawn out from the encoder 231, and a third terminal formed at the substrate groove 120 is electrically brought into contact with a conduction pattern 234.

That is, in a case the second auxiliary PCB 232 of the second encoder unit 230 and the substrate groove 120 are accorded and pushed into, the second auxiliary PCB 232 slides along the substrate groove 120, where if the contact ball 124 of the third terminal is inserted into by the second auxiliary PCB 232 and if the second encoder unit 230 is completely accommodated, the contact ball 124 of the third terminal is pressed to contact the conduction pattern 234 of the second auxiliary PCB 232 and to be electrically connected.

As noted from the above description, a single encoder spacer may be used as a common part to a slim spindle motor and a super slim spindle motor as well.

Any reference in this specification to "one embodiment," "an embodiment," "exemplary embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An encoder spacer for a spindle motor comprising: a body in monolithic structure made of insulation material; a first terminal electrically connected to a main PCB (Printed Circuit Board) of the spindle motor and protruded from a lateral surface of the body; a second terminal electrically connected to the first terminal via a conduction path through the body, electrically connected to a first auxiliary PCB and protruded from an upper surface of the body; a substrate groove including an accommodation space for accommodating the encoder formed at an upper center of the body, wherein a second auxiliary PCB slides in the accommodation space by being inserted into channels at both sides of the accommodation space; and a third terminal exposed at the substrate groove for electrically connecting the second auxiliary PCB with the first terminal.

2. The encoder spacer of claim 1, wherein a bottom surface of the substrate groove is formed with a terminal groove, a support protruder is connected to a portion of the conduction path corresponding to the terminal groove, and wherein the third terminal includes a spring whose one end is inserted to the support protruder within the terminal groove, and a contact ball that is inserted to the other end of the spring.

3. An encoder spacer for a spindle motor comprising: a body in monolithic structure made of insulation material; a first terminal electrically connected to a main PCB (Printed Circuit Board) of the spindle motor; a second terminal electrically connecting a first auxiliary PCB mounted with an encoder and the first terminal; a third terminal electrically connecting a second auxiliary PCB mounted with an encoder and the first terminal; and a substrate groove formed by cutting a part of the body, wherein any one of the first auxiliary PCB and the second auxiliary PCB is fixed to the body at a mutually different position, and wherein the first auxiliary PCB is connected to the second terminal while being exposed to an upper side of the body, and the second auxiliary PCB is connected to the third terminal while being accommodated to the substrate groove.

4. The encoder spacer of claim 3, wherein the third terminal is electrically brought into contact with a conduction pattern exposed to both lateral surfaces of the second auxiliary PCB.

5. The encoder spacer of claim 3, wherein the third terminal is connected to a conduction path connecting the first and second terminals.

6. The encoder spacer of claim 5, wherein the third terminal includes a contact ball exposed to the substrate groove, and a spring elastically supporting the contact ball and electrically connecting the contact ball to the conduction path.

7. An encoder spacer for a spindle motor comprising: a body in monolithic structure made of insulation material; a first terminal electrically connected to a main PCB (Printed Circuit Board) of the spindle motor; a second terminal electrically connecting a first auxiliary PCB mounted with an encoder and the first terminal; and a third terminal electrically connecting a second auxiliary PCB mounted with an encoder and the first terminal, wherein any one of the first auxiliary PCB and the second auxiliary PCB is fixed to the body at a mutually different position, wherein the second terminal is inserted and soldered to the via hole formed at both peripheral margins of the first auxiliary PCB.

8. An encoder assembly comprising: an encoder; an encoder spacer including a body in monolithic structure made of insulation material, a first terminal electrically connected to a main PCB (Printed Circuit Board) of the spindle motor, a second terminal electrically connecting a first auxiliary PCB mounted with an encoder and the first terminal, and a third terminal electrically connecting a second auxiliary PCB mounted with an encoder and the first terminal, wherein any one of the first auxiliary PCB and the second auxiliary PCB is fixed to the body at a mutually different position, and wherein the encoder spacer further includes a substrate groove formed by cutting a part of the body, and wherein the first auxiliary PCB is connected to the second terminal while being exposed to an upper side of the body, and wherein the second auxiliary PCB is connected to the third terminal while being accommodated to the substrate groove.

9. The encoder assembly of claim 8, wherein the third terminal is electrically brought into contact with a conduction pattern exposed to both lateral surfaces of the second auxiliary PCB.

10. The encoder assembly of claim 8, wherein the third terminal is connected to a conduction path connecting the first and second terminals.

11. The encoder assembly of claim 10, wherein the third terminal includes a contact ball exposed to the substrate groove, and a spring elastically supporting the contact ball and electrically connecting the contact ball to the conduction path.

12. An encoder assembly comprising: an encoder; an encoder spacer including a body in monolithic structure made of insulation material, a first terminal electrically connected to a main PCB (Printed Circuit Board) of the spindle motor, a second terminal electrically connecting a first auxiliary PCB mounted with an encoder and the first terminal, and a third terminal electrically connecting a second auxiliary PCB mounted with an encoder and the first terminal, wherein any one of the first auxiliary PCB and the second auxiliary PCB is fixed to the body at a mutually different position, wherein the second terminal is inserted and soldered to a via hole formed at both peripheral margins of the first auxiliary PCB.

* * * * *